(12) United States Patent
Thomson et al.

(10) Patent No.: US 12,189,182 B2
(45) Date of Patent: Jan. 7, 2025

(54) PHOTONIC CHIP AND METHOD OF MANUFACTURE

(71) Applicant: UNIVERSITY OF SOUTHAMPTON, Southampton (GB)

(72) Inventors: David Thomson, Southampton (GB); Graham Reed, Southampton (GB); Weiwei Zhang, Southampton (GB); Martin Ebert, Southampton (GB)

(73) Assignee: University of Southampton (GB)

( * ) Notice: Subject to any disclaimer, the term of this patent is extended or adjusted under 35 U.S.C. 154(b) by 299 days.

(21) Appl. No.: 17/779,436

(22) PCT Filed: Nov. 27, 2020

(86) PCT No.: PCT/EP2020/083674
§ 371 (c)(1),
(2) Date: May 24, 2022

(87) PCT Pub. No.: WO2021/105386
PCT Pub. Date: Jun. 3, 2021

(65) Prior Publication Data
US 2022/0397721 A1      Dec. 15, 2022

(30) Foreign Application Priority Data
Nov. 27, 2019   (GB) .................................. 1917270

(51) Int. Cl.
*G02B 6/122* (2006.01)
*G02B 6/13* (2006.01)
(Continued)

(52) U.S. Cl.
CPC .......... *G02B 6/1228* (2013.01); *G02B 6/131* (2013.01); *G02B 6/132* (2013.01); *G02B 6/136* (2013.01); *G02B 2006/12176* (2013.01)

(58) Field of Classification Search
None
See application file for complete search history.

(56) References Cited

U.S. PATENT DOCUMENTS

| | | | |
|---|---|---|---|
| 8,652,934 | B1 | 2/2014 | Meade et al. |
| 2003/0018319 | A1 | 6/2003 | Chong et al. |

(Continued)

FOREIGN PATENT DOCUMENTS

| | | |
|---|---|---|
| CN | 106461873 A | 2/2017 |
| CN | 106501899 A | 3/2017 |

(Continued)

OTHER PUBLICATIONS

GB Examination Report for Application No. GB1917270.9 dated Mar. 31, 2023, 2 page.

(Continued)

*Primary Examiner* — Jerry Rahll
(74) *Attorney, Agent, or Firm* — Quarles & Brady LLP (57) ABSTRACT

A method of manufacturing a photonic chip. The method comprises providing a wafer comprising a silicon substrate, and a low refractive index layer above the silicon substrate, forming a first trench having a first height and a second trench having a second height by etching the low refractive index layer. The second height is greater than the first height and the second trench has a bottom surface that is closer to the substrate than a bottom surface of the first trench.

14 Claims, 5 Drawing Sheets

(51) Int. Cl.
   *G02B 6/132*   (2006.01)
   *G02B 6/136*   (2006.01)
   *G02B 6/12*    (2006.01)

(56) References Cited

U.S. PATENT DOCUMENTS

| | | | |
|---|---|---|---|
| 2011/0170825 | A1 | 7/2011 | Spector et al. |
| 2014/0357086 | A1 | 12/2014 | Kiehlbauch |
| 2018/0172909 | A1* | 6/2018 | Asghari ................ G02B 6/305 |

FOREIGN PATENT DOCUMENTS

| | | |
|---|---|---|
| CN | 106877169 A | 6/2017 |
| CN | 108885307 A | 11/2018 |
| GB | 2552264 A | 1/2018 |
| GB | 2552264 A9 | 1/2018 |
| JP | 06069605 A | 3/1994 |
| JP | 2001-249240 A | 9/2001 |
| JP | 2015-075616 A | 4/2015 |
| WO | WO-2003-025643 A1 | 3/2003 |

OTHER PUBLICATIONS

GB Examination Transmittal for Application No. GB1917270.9 dated Mar. 31, 2023, 2 page.

First Chinese Office Action, Application No. 202080031337.2, issued on Jan. 1, 2024, 15 pages, (with English Translation).

Yanagawa et al., "Index and Dimensional Taper and Its Application to Photonic Devices", Journal of Lightwave Technology, vol. 10, May 31, 1992, 6 pages.

Johnson, B. et al., "Solid-Phase Epitaxy," *Handbook of Crystal Growth*, $2^{nd}$ Ed, vol. III, Part A, Chapter 7 (2015) pp. 317-363, 47 pages.

Cheben, P. et al, "Subwavelength Waveguide Grating for Mode Conversion and Light Coupling in Integrated Optics," *Optics Express*, vol. 14, No. 11 (2006), pp. 4695-4702, 8 pages.

GB Search Report for Application No. GB1917270.9 dated May 22, 2020, 1 page.

\* cited by examiner

1. Starting SOI wafer

Fig. 4A

2. Deposit SiO2

Fig. 4B

3. Etch trenches in Si/SiO2

Fig. 4C

4. Deposit Silicon

Fig. 4D

5. CMP

Fig. 4E

6. Etch waveguides

Fig. 4F

1. Starting Si wafer

Fig. 5A

2. Grow/deposit SiO2

Fig. 5B

3. Etch trenches in SiO2

Fig. 5C

4. Deposit Silicon

PHOTONIC CHIP AND METHOD OF MANUFACTURE

RELATED APPLICATIONS

This application is a 35 U.S.C. § 371 national phase application of PCT/EP2020/083674 (WO 2021/105386 A1), filed on Nov. 27, 2020, entitled "PHOTONIC CHIP AND METHOD OF MANUFACTURE," which application claims the benefit of GB Patent Application No. 1917270.9, filed Nov. 27, 2019, the entire teachings of which are incorporated herein by reference in their entirety for all purposes.

FIELD OF THE INVENTION

The present invention relates to photonic chips and the manufacture of waveguides on photonic chips.

BACKGROUND

In the field of photonic chips, it is often necessary to provide waveguides of differing sizes on the same photonic chip, the waveguides being suitable for different purposes, such as coupling to differently sized components such as optoelectronic devices or optical fibres.

Chips having differently sized waveguides can be difficult to subsequently process, for example using chemical mechanical polishing (CMP) due to the change in the top surface height across the chip.

The present invention has been devised in light of the above considerations.

SUMMARY OF THE INVENTION

In a first aspect, the invention provides a method of manufacturing a photonic chip, the method comprising: providing a wafer comprising a substrate, and a low refractive index layer above the substrate, etching the low refractive index layer to form a first trench having a first height and a second trench having a second height, the second height being greater than the first height, and the second trench having a bottom surface that is closer to the substrate than a bottom surface of the first trench.

By having a low refractive index, the low refractive index layer can confine light to the waveguide In this application, low refractive index may have a refractive index lower than that of the waveguide material. The low refractive index may have a refractive index lower than that of silicon. For, example, a low refractive index may be less than 3.4 at a wavelength of 1200-8500 nm. The low refractive index material may be SiO2. Alternatively or additionally, any low refractive index layer in this application may be an insulting layer. Further, where the term insulating layer is used in this application, such a layer may alternatively or additionally be a low refractive index layer.

The height of a layer or a waveguide or trench is measured in a direction away from the substrate. A top surface of a layer or a waveguide is the surface that is farthest from the substrate and a bottom surface of a layer or waveguide or the base of a trench is the surface that is closest to the substrate. For example, a height of a waveguide is measured from the bottom surface of the waveguide to a top surface of the waveguide in a direction normal to the surface of the substrate. A width of a waveguide is measured in a direction perpendicular to the height and perpendicular to the direction of propagation of light along the waveguide. A length of a waveguide is measured in a direction perpendicular to the height and parallel to the direction of propagation of light along the waveguide.

The substrate may be a silicon substrate.

The heights of the waveguides may be in the range of 100 nm to 12 microns. The first height may be less than 550 nm, preferably between 100 nm and 500 nm and more preferably is 220 nm. The second height may be between 1 and 12 microns, preferably between 2 and 5 microns and more preferably is 3 microns. Optionally, a height of the second trench may be 10 microns or 12 microns.

The method may further comprise etching the low refractive index layer to form one or more additional trenches of the same or different depths to the first or second trenches.

The first trench and the second trench may be etched using reactive ion etching (RIE). Due to a phenomenon called RIE lag, the wider the trench is, the deeper it is etched. Thus the width of the trench may be used to control the depth of the trench.

The second trench may be etched through the whole height of the low refractive index layer so that a base of the trench is formed by a surface of the substrate. This may enable the substrate to be used as a seed for regrowth of silicon deposited in the second trench.

Etching the first trench and etching the second trench may occur simultaneously. Simultaneously may mean that the steps occur with the same start and end times as one another, so that the time over which each of the steps entirely overlaps. Simultaneously may also mean a partial overlap in duration of two simultaneous steps. A single process may be used to complete multiple simultaneous steps.

A width of the second trench may be greater than a width of the first trench. The widths of the trenches may be between 80 nm and 12 microns. The width of the first trench may be in the range 80 nm to 3000 nm or 250 nm to 3000 nm, preferably 500 nm+/−100 nm. The width of the second trench may be 1 to 12 microns, preferably 3 microns.

When using RIE, a wider trench will be etched to a greater height using the same conditions due to an effect called RIE lag. So a single RIE process can be used to etch trenches of multiple depths by etching the trenches with different widths.

The method may further comprise depositing a mask on the photonic chip and patterning the mask to define the trench locations and widths.

The method may further comprise forming a first waveguide in the first trench. The method may also comprise forming a second waveguide in the second trench. The first and/or second waveguide may be formed of silicon. Forming the first waveguide and forming the second waveguide may occur simultaneously. A width of the second waveguide may be greater than a width of the first waveguide. The method may further comprise forming one or more additional waveguides in one or more additional trenches. The layout of the trenches can be designed according to the application for which the waveguides will be used.

The first and/or second waveguide may be epitaxially grown. Alternatively, the first and/or second waveguide may be deposited by chemical vapour deposition (CVD), atomic layer deposition, evaporation or sputtering. The first and/or second waveguide may be deposited as poly-crystalline or amorphous material and then later thermally regrown to form a poly-crystalline or single crystal structure. The first and/or second waveguide may be formed of polycrystalline silicon, amorphous silicon or single crystal silicon. The first and/or second waveguide may be formed of silicon, germanium, or silicon nitride, or oxynitride in any combination.

The step of forming the first waveguide may comprise filling the first trench with polycrystalline silicon, amorphous silicon or single crystal silicon. The step of forming the second waveguide may comprise filling the second trench with polycrystalline silicon, amorphous silicon or single crystal silicon.

The step of forming the first and/or the second waveguide may comprise epitaxially growing silicon in the respective first and/or second trench.

The step of forming the first and second waveguides may comprise: overfilling the first and second trenches such that the silicon in the first trench is joined to the silicon in the second trench by excess silicon; and regrowing the silicon in the first and second trenches to form single crystal silicon. This means that single crystal silicon waveguides can be provided, even if the base of the waveguide is not in the substrate or another silicon layer. Further, if the base of the second trench is formed by the substrate, the silicon in the first trench can be regrown using the substrate as the seed to form single crystal waveguides even if the base of the first trench is not formed of silicon.

The step of forming the first and second waveguides may comprise planarising the silicon in the first and the second trenches, such that a top surface of the first waveguide is coplanar with a top surface of the second waveguide. Planarising may include chemical mechanical polishing. Having coplanar top surfaces of the waveguide enables simpler subsequent processing, for example by CMP, of the chip.

Alternatively, the top surfaces of the first and second waveguides may not be coplanar. A centre height of the first waveguide may be coplanar with the centre height of the second waveguide. The centre height of each waveguide being a height that is an equal distance from a bottom surface and a top surface of the respective waveguide. This can be beneficial when light is to be guided between the waveguides of different heights.

A height of a mode of the first waveguide may be coplanar with a height of a mode of the second waveguide. A height of a core of the first waveguide may be coplanar with a height of a core of the second waveguide. Where multiple modes are formed in the second waveguide, a height of one or more of these modes may be aligned with a height of a mode of the first waveguide and vice versa.

In this disclosure, surfaces that differ in height by less than 50 nm are regarded as coplanar as the difference in height is negligible. Such height differences may be caused by manufacturing processes such as a CMP stop layer.

The step of forming the first and/or second waveguide may comprise etching material in the respective first and/or second trench to form a rib waveguide. The first and/or second waveguide may be strip, rib or slot shaped waveguides. Forming the first and/or second waveguide may comprise etching material in the respective first and/or second trench(es) to form a strip, rib or slot shaped waveguide.

The first and/or second waveguide may be formed of a sequence of materials and the sequence may be periodic. For example, one or more of the waveguides may be formed of alternating segments of silicon oxide and silicon which may be adjusted in size to select the desired refractive index of the waveguide. The segments may be sized such that their length is less than the wavelength of the light to be passed through the waveguide. The step of forming first and/or the second waveguide may comprise depositing or growing a sequence of materials over the length of the waveguide. The sequence may be periodic. For example, one or more of the waveguides may be formed of alternating segments of silicon oxide and silicon which may be adjusted in size to select the desired refractive index of the waveguide. The segments may be sized such that their length is less than the wavelength of the light to be passed through the waveguide. An example of a method for producing a waveguide with a sequence of materials is given in Cheben P et al. 2006 'Subwavelength waveguide grating for mode conversion and light coupling in integrated optics' *Optics Express* v 14. n 11, p 4695-4702.

The processes described herein may be used for either one or both of the first and/or second waveguides and/or for one or more additional waveguides.

The wafer may be a silicon-on-insulator (SOI) wafer comprising the substrate formed of silicon, the low refractive index layer and a silicon device layer. If the SOI is used, etching the first and/or second trenches may comprise etching through the top device layer, and into the low refractive index layer.

The wafer may be a double silicon-on-insulator wafer comprising a top silicon device layer, the low refractive index layer beneath the top silicon device layer, an intermediate device layer beneath the low refractive index layer, a further low refractive index layer beneath the intermediate device layer and the substrate beneath the further low refractive index layer. If the double SOI is used, etching the first and/or second trenches may comprise etching through the top silicon device layer, through the low refractive index layer, through the intermediate device layer and into the further low refractive index layer. Further, the trench may be etched through the whole height of the further low refractive index layer so that a base of the trench is formed by a surface of the substrate. Etching the first and/or second trenches may comprise etching through the top silicon device layer and into the low refractive index layer. Further, the trench may be etched through the whole height of the low refractive index layer so that a base of the trench is formed by a surface of the intermediate device layer.

The method may further comprise depositing a top layer of low refractive index material before etching the first and second trenches and the step of etching the first and second trenches may comprise etching through the top layer.

The method may further comprise depositing or growing a low refractive index material on the substrate to form the low refractive index layer.

The first and second waveguides may be joined by a tapered waveguide which may be contiguous with the first waveguide at a first end of the tapered waveguide and/or may be contiguous with the second waveguide at a second end of the tapered waveguide. The term contiguous means that the tapered waveguide meets the first/second waveguide at a border and may be continuous with the first/second waveguide (for example the tapered waveguide may form a single crystal with the first/second waveguide) or may meet the first/second waveguide at an interface where the internal structure of the tapered waveguide and the first/second waveguide are not aligned (for example, the tapered waveguide may be amorphous silicon and the first/second waveguide may be single crystal or the first/second waveguide and the tapered waveguide may be formed of different materials).

Using a tapered connection, light may pass through the tapered waveguide from a large component (e.g. waveguide or fibre) to a smaller component (e.g. waveguide) by passing from the large component, through the second waveguide, through the tapered waveguide from the second end to the first end, into the first waveguide and then into the smaller component. Alternatively, light may pass through the tapered waveguide from a small component to a larger component by passing from the small component, through the first waveguide, through the tapered waveguide from the first end to the second end, into the second waveguide and then into the large component. By passing through the first and second waveguides and the tapered waveguide, the optical loss between the small and large components is reduced.

The width, and/or the height, of the trench may be varied continuously from the first end to the second end of the tapered waveguide to give a smooth change in width and/or height along the length of the tapered waveguide. Alternatively, the width and/or height of the tapered waveguide may be varied in steps along the length of the tapered waveguide. The steps may be at regular intervals along the length of the tapered waveguide.

In a second aspect, the invention provides a photonic chip a substrate, and a low refractive index layer above the substrate, a first waveguide having a first height and a second trench having a second height, the second height being greater than the first height, and the second trench having a bottom surface that is closer to the substrate than a bottom surface of the first trench.

The substrate may be a silicon substrate.

The heights of the waveguides may be in the range of 100 nm to 12 micron. The first height may be less than 550 nm, preferably between 100 nm and 500 nm and more preferably is 220 nm. The second height may be between 1 and 12 microns, preferably between 2 and 5 microns and more preferably is 3 microns. Optionally, the second height may be 10 microns or 12 microns.

The photonic chip may further include one or more additional waveguides of the same or different heights to the first or second waveguides. These waveguides may be formed at the same time and using the same process as the first and second waveguides.

A width of the second waveguide may be greater than a width of the first waveguide. The widths of the trenches may be between 80 nm and 12 microns. The width of the first waveguide may in the range 80 nm to 3000 nm or 250 nm to 3000 nm, preferably 500 nm+/−100 nm. The width of the second waveguide may be 1 to 12 microns, preferably 3 microns.

The first and/or second waveguide may be formed of polycrystalline silicon, amorphous silicon or single crystal silicon. The first and/or second waveguide may be formed of silicon, germanium, or silicon nitride, or oxynitride in any combination.

A top surface of the first waveguide may be coplanar with a top surface of the second waveguide. Having coplanar top surfaces of the waveguide enables simpler subsequent processing, for example by CMP, of the chip. When one or more additional waveguides are also formed, all of the waveguides may have a coplanar top surfaces.

Alternatively, the top surfaces of the first and second waveguides may not be coplanar. A centre height of the first waveguide may be coplanar with the centre height of the second waveguide. The centre height of each waveguide being a height that is an equal distance from a bottom surface and a top surface of the respective waveguide. This can be beneficial when light is to be guided between the waveguides of different heights.

A height of a mode of the first waveguide may be coplanar with a height of a mode of the second waveguide. A height of a core of the first waveguide may be coplanar with a height of a core of the second waveguide. Where multiple modes are formed in the second waveguide, a height of one or more of these modes may be aligned with a height of a mode of the first waveguide and vice versa.

The first and/or second waveguide may be strip, rib or slot shaped waveguides.

The first and/or second waveguide may be formed of a sequence of materials and the sequence may be periodic. For example, one or more of the waveguides may be formed of alternating segments of silicon oxide and silicon which may be adjusted in size to select the desired refractive index of the waveguide. The segments may be sized such that their length is less than the wavelength of the light to be passed through the waveguide. An example of a method for producing a waveguide with a sequence of materials is given in Cheben P et al. 2006 'Subwavelength waveguide grating for mode conversion and light coupling in integrated optics' *Optics Express* v 14. n 11, p 4695-4702.

The processes described herein may be used for either one or both of the first and/or second waveguides and/or for one or more additional waveguides.

The photonic chip may further comprise a silicon device layer above the low refractive index layer. The first waveguide may be through the top device layer, and into the low refractive index layer.

The photonic chip may comprise a top silicon device layer, the low refractive index layer beneath the top silicon device layer, an intermediate device layer beneath the low refractive index layer, a further low refractive index layer beneath the intermediate device layer and the substrate beneath the further low refractive index layer. The first and/or second waveguides may be through the top silicon device layer, through the low refractive index layer, through the intermediate device layer and into the further low refractive index layer. They may be etched through the whole height of the further low refractive index layer so that a base of the waveguide is formed by a surface of the substrate. The first and/or second waveguides may be through the top silicon device layer and into the low refractive index layer so that a base of the waveguide is formed in the low refractive index layer. They may be through the whole height of the low refractive index layer so that a base of the waveguide is formed by a surface of the intermediate device layer.

The first and second waveguides may be joined by a tapered waveguide which may be contiguous with the first waveguide at a first end of the tapered waveguide and/or may be contiguous with the second waveguide at a second end of the tapered waveguide. The term contiguous means that the tapered waveguide meets the first/second waveguide at a border and may be continuous with the first/second waveguide (for example the tapered waveguide may form a single crystal with the first/second waveguide) or may meet the first/second waveguide at an interface where the internal structure of the tapered waveguide and the first/second waveguide are not aligned (for example, the tapered waveguide may be amorphous silicon and the first/second waveguide may be single crystal or the first/second waveguide and the tapered waveguide may be formed of different materials). When one or more additional waveguides are formed a pair of any of the waveguides with different sizes to each other may be joined in the same way by a tapered waveguide.

Using a tapered connection, light may pass through the tapered waveguide from a large component (e.g. waveguide or fibre) to a smaller component (e.g. waveguide) by passing from the large component, through the second waveguide, through the tapered waveguide from the second end to the first end, into the first waveguide and then into the smaller component. Alternatively, light may pass through the tapered waveguide from a small component to a larger component by passing from the small component, through the first waveguide, through the tapered waveguide from the first end to the second end, into the second waveguide and then into the large component. By passing through the first and second waveguides and the tapered waveguide, the optical loss between the small and large components is reduced.

The width, and/or the height, of the trench may be varied continuously from the first end to the second end of the tapered waveguide to give a smooth change in width and/or height along the length of the tapered waveguide. Alternatively, the width and/or height of the tapered waveguide may be varied in steps along the length of the tapered waveguide. The steps may be at regular intervals along the length of the tapered waveguide.

The varied height of the tapered waveguide may be controlled by varying the width of the tapered waveguide in a similar manner to the control of the height of the waveguides described in this application.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
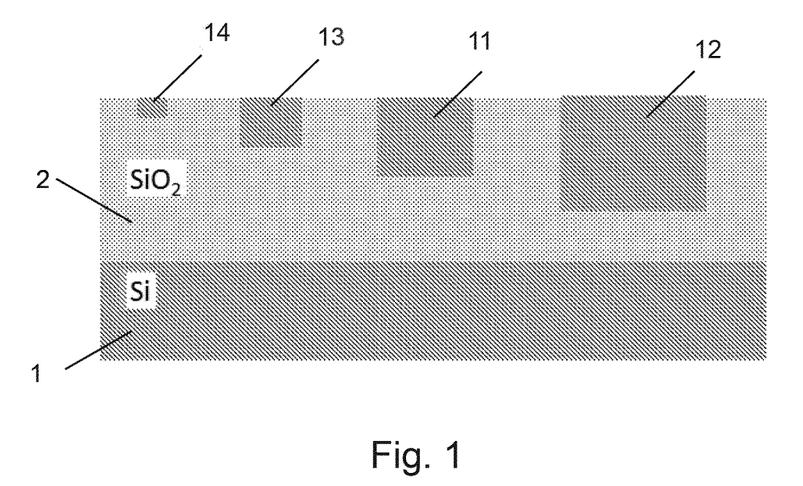
FIG. 1 shows a section view of a photonic chip with four waveguides of different heights, all having coplanar top surfaces.

FIG. 1 shows a photonic chip comprising a silicon substrate 1, and a low refractive index layer 2 above the silicon substrate 1, and four waveguides 11, 12, 13, 14. The first waveguide 11 has a first height from a bottom surface of the waveguide in the low refractive index layer 2 to a top surface of the waveguide. The second waveguide 12 has a second height from a bottom surface of the waveguide in the low refractive index layer 2 to a top surface of the waveguide. The second height being greater than the first height. The third waveguide 13 has a third height smaller than the first and second heights. The fourth waveguide 14 has a fourth height that is smaller than the third height.

The waveguides 11, 12, 13, 14 all have coplanar top surfaces, so the greater the height of the waveguide, the closer the bottom surface of the waveguide is to the substrate. The second waveguide 12 has the greatest height, so the bottom surface of the second waveguide is closer to the substrate than a bottom surface of any of the other waveguides.

In other embodiments, the top surfaces may not be coplanar. For example, a centre height of the one of the waveguides may be coplanar with the centre height of another of the waveguides. The centre height of each waveguide being a height that is an equal distance from a bottom surface and a top surface of the respective waveguide. This can be beneficial when light is to be guided between the waveguides of different heights.

A height of a mode of one of the waveguides may be coplanar with a height of a mode of another of the waveguides. A height of a core of one of the waveguides may be coplanar with a height of a core of another of the waveguides. Where multiple modes are formed in a waveguide, a height of one or more of these modes may be aligned with a height of a mode of another of the waveguides.

The waveguides are pictured in order from smallest on the left of the diagram to the greatest height on the right of the diagram, but it will be appreciated that his is simply for illustration purposes and the orientation and location of the waveguides on the chip can be selected freely to suit the application.

The waveguides are strip waveguides and fill the trenches in the low refractive index layer 2. The top surface of each of the waveguides 11, 12, 13, 14 is coplanar with the top surface of the low refractive index layer 2. The low refractive index layer 2 in this example is $SiO_2$.

Figure 2:
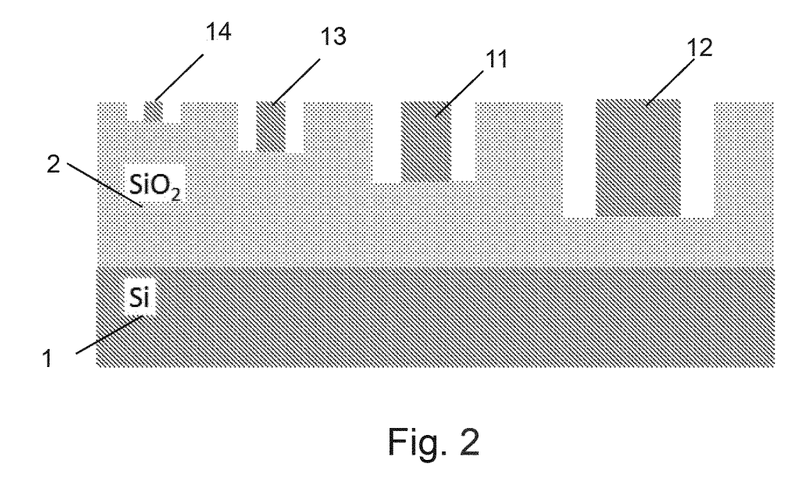
FIG. 2 a section view of a photonic chip with four strip waveguides of different heights, all having coplanar top surfaces.

FIG. 2 shows a photonic chip which is similar to the photonic chip of FIG. 1, but the waveguides do not fill the trenches in the low refractive index and there are gaps between the trench walls and the waveguides on each side of each of the waveguides. This illustrates the possibility of etching one or more of the waveguides to form the desired width and shape for the application.

To form this photonic chip, the waveguides 11, 12, 13, 14 shown in FIG. 1 may be etched to form side trenches on each side of the waveguides. This may be achieved by depositing a mask on the top surface of the chip, patterning the mask to the desired waveguide width and etching the waveguides to produce the desired shape.

Figure 3A:
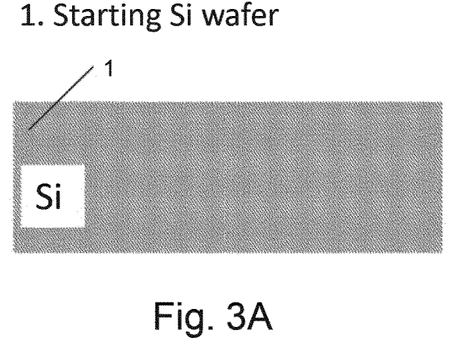
FIGS. 3A to 3F show section views of steps in a method of manufacture of the photonic chip of FIG. 2.
Figure 3B:
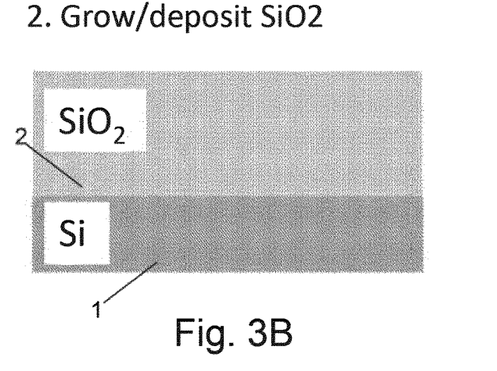

FIG. 3 shows steps in a method of manufacture of a photonic chip starting from a silicon (Si) wafer 1 as shown in FIG. 3A. In FIG. 3B, a low refractive index layer 2 has been grown or deposited on the silicon substrate 1. In this example, the low refractive index layer 2 is formed of $SiO_2$.

Figure 3C:
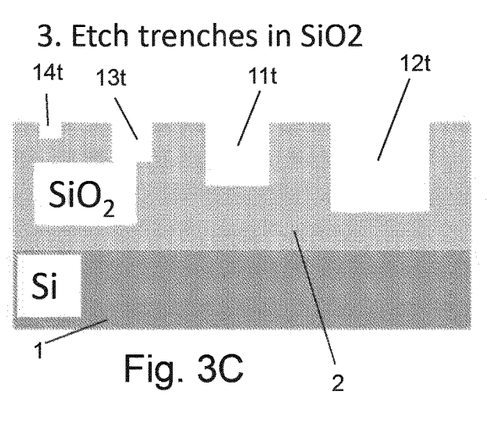

A mask may be provided over the low refractive index layer 2 and patterned to the desired layout and width of the trenches within which the waveguides will later be formed. Trenches 11*t*, 12*t*, 13*t*, 14*t* are etched into the low refractive index layer 2 as shown in FIG. 3C. The four trenches illustrated in this figure are illustrative of the concept that different height trenches may be produced simultaneously. In other examples, any number of trenches may be formed using this technique at any desired combination of heights.

The example shown in FIG. 3C shows four trenches. The first trench 11*t* has a first height from a base of the trench in the low refractive index layer 2 to the height of the top surface of the low refractive index layer 2. The second trench 12*t* has a second height from a base of the trench in the low refractive index layer 2 to the height of the top surface of the low refractive index layer 2. The second height being greater than the first height. The third waveguide 13 has a third height smaller than the first height. The fourth waveguide 14 has a fourth height that is smaller than the third height.

All of the trenches have their base formed by the low refractive index layer 2. In other embodiments, the base of one or more trenches may be formed by the silicon substrate 1.

An example of a suitable etching process is inductively coupled plasma reactive ion etching. Here the additional electromagnetic inducted plasma enables high plasma densities and allows to control the degree of ionization of an argon and octafluorocyclobutane gas combination. The trench width depended etch depth can be controlled by exploiting the physical effect of RIE lag. This effect is mainly depended on the gas flow ratio of argon and octafluorocyclobutane. Here argon is used for controlling the degree of ionization and the density of the plasma and the level of anisotropic etching, where the Octafluorocyclobutane controls the degree of polymerization. In this example, the chamber pressure is low, the ICP power is several thousand watts and the RF power is in the range of hundreds of watts. These parameters allow to etch silicon dioxide with an etch rate between 1.5 nm/s to 6 nm/s. In one specific example around 2000 nm is etched into the silicon dioxide layer for a 3000 nm wide trench whilst the etch depth into the silicon dioxide layer for a 250 nm width trench is only 200 nm.

Figure 3D:
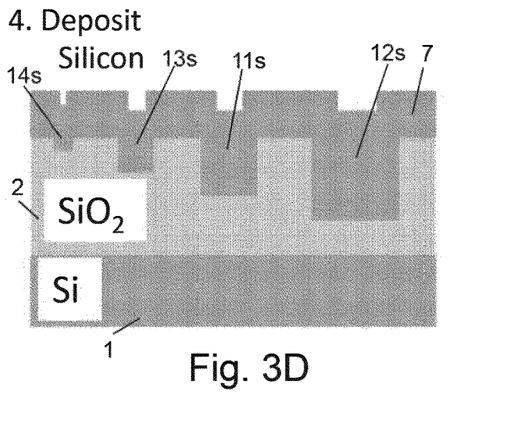

In FIG. 3D, the trenches are filled with the material that will form the waveguides. In this example, the material is silicon. In other examples, the waveguides may be formed of silicon, germanium, or silicon nitride, or oxynitride in any combination.

The silicon may be deposited or grown and may be polycrystalline silicon, amorphous silicon or single crystal silicon. The waveguide material may be deposited by chemical vapour deposition (CVD), atomic layer deposition, evaporation or sputtering.

The silicon 11s, 12s, 13s, 14s fills the trenches and excess silicon 7 is deposited above the trenches and above the low refractive index layer 2.

Figure 3E:
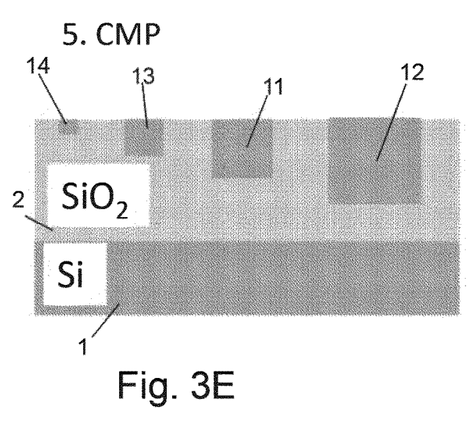

The silicon is then planarised, for example using CMP to form a planar top surface of the photonic chip as shown in FIG. 3E. This produces a photonic chip as shown in FIG. 1.

Figure 3F:
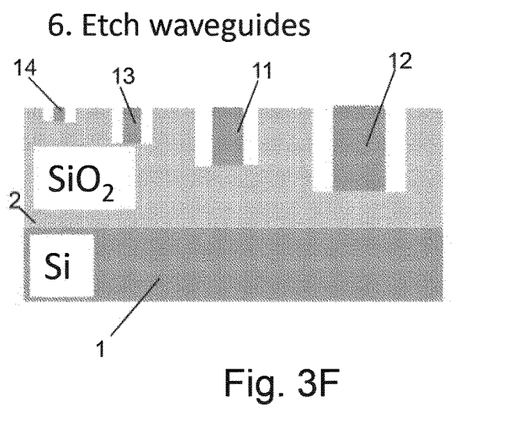

Optionally, the waveguides 11, 12, 13, 14 may be etched to a desired width that is less than the width of the trenches 11t, 12t, 13t, 14t as shown in FIG. 3F.

The waveguides may be etched to form a shape as desired by the application for which the photonic chip is to be used. One or more of the waveguides 11, 12, 13, 14 may be etched to form strip, rib or slot shaped waveguide. The waveguides may all be the same shape or may be etched differently to each other as required.

FIGS. 4A to 4F show another manufacturing process to form a photonic chip, but starting from a SOI wafer. The SOI wafer has a silicon substrate 1, a low refractive index layer 2 and a silicon device layer 3.

Figure 4A:
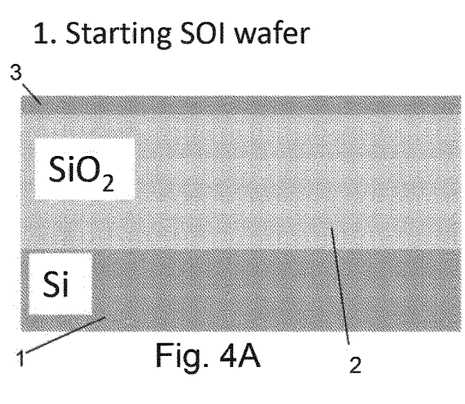
FIGS. 4A to 4F show section views of steps in a method of manufacture of a photonic chip with waveguides of differing heights on a SOI wafer.
Figure 4B:
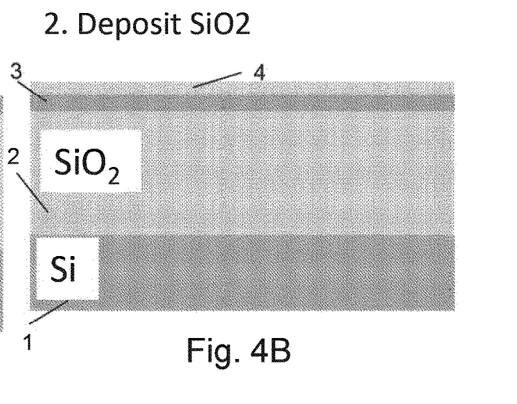

As shown in FIG. 4B, a layer of $SiO_2$ 4 is deposited on the silicon device layer 3. The layer of $SiO_2$ 4 acts as a stop layer for later planarising of the waveguides. The layer 4 allows better control of the height of polishing of the chip and so better control of the waveguide height. In other embodiments, the $SiO_2$ can be replaced by SiN or another suitable stop material. Alternatively, the stop layer could be omitted.

Figure 4C:
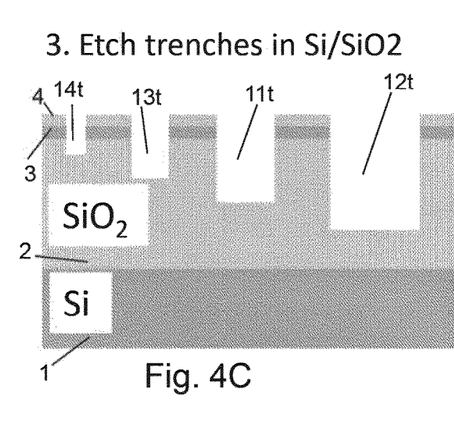

Trenches 11t, 12t, 13t, 14t are etched through the layer of $SiO_2$ 4 and through the silicon device layer 3 and into the low refractive index layer 2 as shown in FIG. 4C. An example of a suitable etching process is inductively coupled plasma reactive ion etching as described above.

The four trenches illustrated in this figure are illustrative of the concept that different height trenches may be produced simultaneously in the low refractive index layer 2. In other examples, any number of trenches may be formed using this technique at any desired combination of heights.

The example shown in FIG. 4C shows four trenches. The first trench 11t has a first height from a base of the trench in the low refractive index layer 2 to the height of the top surface of the layer of $SiO_2$ 4. The second trench 12t has a second height from a base of the trench in the low refractive index layer 2 to the height of the top surface of the top surface of the layer of $SiO_2$ 4. The second height being greater than the first height. The third waveguide 13 has a third height smaller than the first height. The fourth waveguide 14 has a fourth height that is smaller than the third height.

All of the trenches have their base formed by the low refractive index layer 2. In other embodiments, the base of one or more trenches may be formed by the silicon device layer 3 or the silicon substrate 1.

Figure 4D:
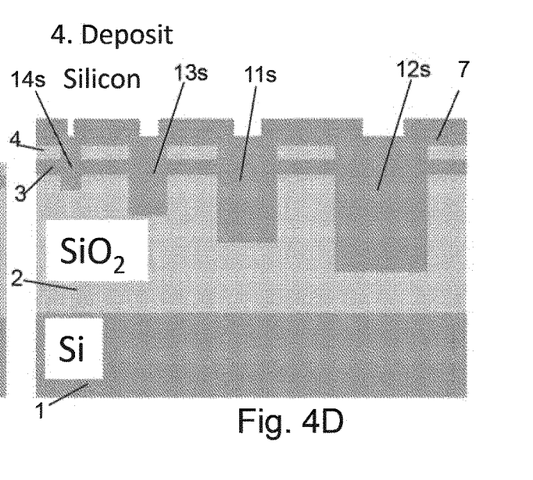

In FIG. 4D, the trenches are filled with the material that will form the waveguides. In this example, the material is silicon. In other examples, the waveguides may be formed of silicon, germanium, or silicon nitride, or oxynitride in any combination.

The silicon may be deposited or grown and may be polycrystalline silicon, amorphous silicon or single crystal silicon. The waveguide material may be deposited by chemical vapour deposition (CVD), atomic layer deposition, evaporation or sputtering.

The silicon 11s, 12s, 13s, 14s fills the trenches and excess silicon 7 is deposited above the trenches and above the $SiO_2$ layer 2.

Figure 4E:
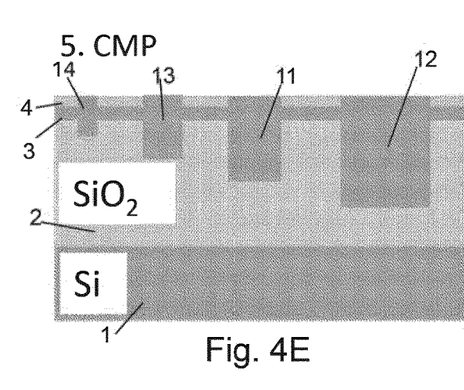
Figure 4F:
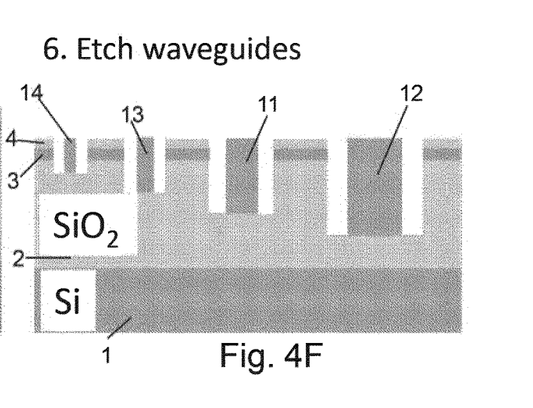

The silicon is then planarised, for example using CMP to form a planar top surface of the photonic chip as shown in FIG. 4E at the height of the top surface of the layer of $SiO_2$ 4. Optionally, the waveguides 11, 12, 13, 14 may be etched to a desired width that is less than the width of the trenches 11t, 12t, 13t, 14t as shown in FIG. 4F.

The waveguides may be etched to form a shape as desired by the application for which the photonic chip is to be used. One or more of the waveguides 11, 12, 13, 14 may be etched to form strip, rib or slot shaped waveguide. The waveguides may all be the same shape or may be etched differently to each other as required.

The process described in relation to FIG. 4 may be modified to start from a double SOI wafer. The double SOI wafer comprises a top silicon device layer, the low refractive index layer beneath the top silicon device layer, a silicon intermediate device layer beneath the low refractive index layer, a further low refractive index layer beneath the intermediate device layer and the substrate beneath the further low refractive index layer. If the double SOI is used, etching the trenches may comprise etching through the top silicon device layer, through the low refractive index layer, through the intermediate device layer and into the further low refractive index layer. Trenches may be etched through the whole height of the further low refractive index layer so that a base of the trench is formed by a surface of the substrate. Etching of a trench may be through the top silicon device layer and into the low refractive index layer. A trench may be etched through the whole height of the low refractive index layer so that a base of the trench is formed by a surface of the intermediate device layer.

Figure 5A:
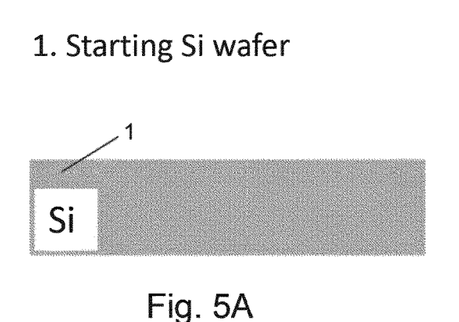
FIGS. 5A to 5G show section views of steps in a method of manufacture of a photonic chip with four waveguides of different heights.
Figure 5B:
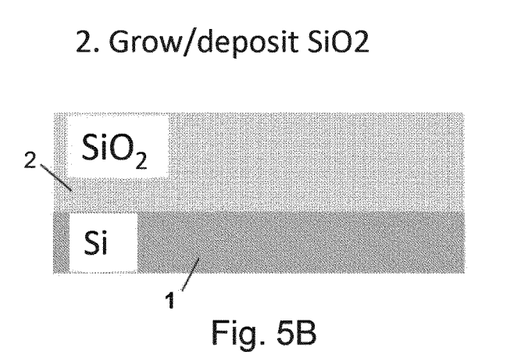

FIGS. 5A to 5G show another manufacturing process to form a photonic chip starting from the silicon wafer shown in FIG. 5A. In FIG. 5B, a low refractive index layer 2 has been grown or deposited on the silicon substrate 1. In this example, the low refractive index layer 2 is formed of $SiO_2$.

Figure 5C:
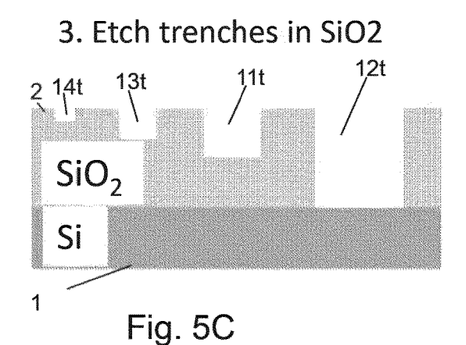

A mask may be provided over the low refractive index layer 2 and patterned to the desired layout and width of the trenches within which the waveguides will later be formed. Trenches 11$t$, 12$t$, 13$t$, 14$t$ are etched into the low refractive index layer 2 as shown in FIG. 5C. The four trenches illustrated in this figure are illustrative of the concept that different height trenches may be produced simultaneously. In other examples, any number of trenches may be formed using this technique at any desired combination of heights.

The example shown in FIG. 5C shows four trenches. The first trench 11$t$ has a first height from a base of the trench in the low refractive index layer 2 to the height of the top surface of the low refractive index layer 2. The second trench 12$t$ has a second height from a base of the trench on the silicon substrate 1 to the height of the top surface of the low refractive index layer 2. The second height being greater than the first height. The third waveguide 13 has a third height smaller than the first height. The fourth waveguide 14 has a fourth height that is smaller than the third height.

Etching of the second trench is all of the way through the low refractive index layer 2, so that the base of the second trench 12 is formed by the top surface of the silicon substrate 1. In other embodiments, etching may go into the substrate so that the base is formed in the silicon substrate, below the height of the top surface of the substrate. The bases of the other trenches are in the low refractive index layer 2, but in other embodiments, one or more other trenches may have their bases in the silicon substrate.

An example of a suitable etching process is inductively coupled plasma reactive ion etching as described above.

Figure 5D:
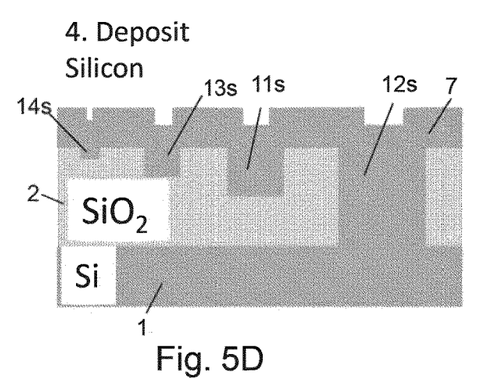

In FIG. 5D, the trenches are filled with the material that will form the waveguides. In this example, the material is silicon. In other examples, the waveguides may be formed of silicon, germanium, or silicon nitride, or oxynitride in any combination.

The silicon may be deposited or grown and may be polycrystalline silicon, amorphous silicon or single crystal silicon. The waveguide material may be deposited by chemical vapour deposition (CVD), atomic layer deposition, evaporation or sputtering.

The silicon 11$s$, 12$s$, 13$s$, 14$s$ fills the trenches and excess silicon 7 is deposited above the trenches and above the low refractive index layer 2. The excess silicon 7 connects the silicon 11$s$, 12$s$, 13$s$, 14$s$ deposited in each of the trenches.

Figure 5E:
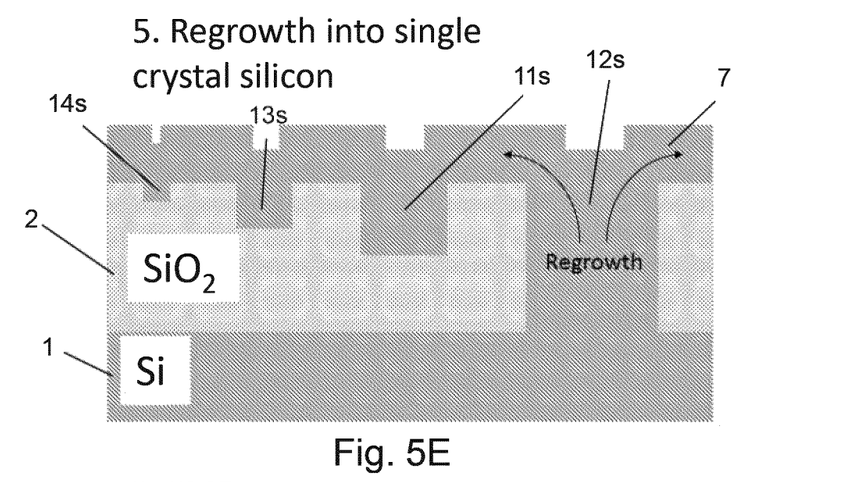

The base of the second trench 12$t$ is formed by the silicon substrate 1, so the silicon in the second trench 12$s$ is in contact with the silicon substrate 1 which is single crystal silicon. So, this allows the silicon substrate 1 to be used as a seed for regrowth of the silicon in the second trench 12$s$. Further, because the excess silicon 7 connects the silicon in the second trench 12$s$ with the silicon in the other trenches 11$s$, 13$s$, 14$s$, the silicon in all of the trenches can be regrown using the silicon substrate 1 as the seed to form single crystal waveguides. This means that waveguides may be regrown even if their base is not in the substrate or another single crystal silicon layer. An example method of regrowth is shown in the Handbook of Crystal Growth, $2^{nd}$ edition, Volume III, Part A, Thin Films and Epitaxy: Basic Techniques, Chapter 7.1, by T. F Kuech, 2015.

Figure 5F:
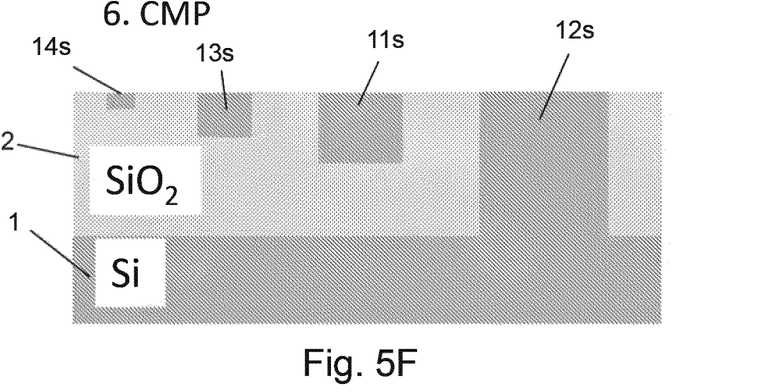

The silicon is then planarised, for example using CMP to form a planar top surface of the photonic chip as shown in FIG. 5F. This produces a photonic chip as shown in FIG. 1.

Figure 5G:
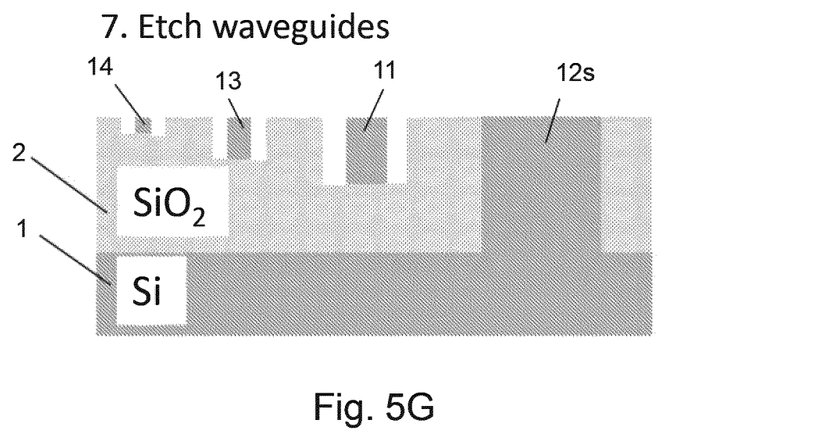

Optionally, the waveguides 11, 13, 14 may be etched to a desired width that is less than the width of the trenches 11$t$, 13$t$, 14$t$ as shown in FIG. 5G. The silicon 12$s$ does not form an effective waveguide as light can escape into the silicon substrate due to the base of the silicon 12$s$ being in contact with the substrate.

The waveguides may be etched to form a shape as desired by the application for which the photonic chip is to be used. One or more of the waveguides 11, 13, 14 may be etched to form strip, rib or slot shaped waveguide. The waveguides may all be the same shape or may be etched differently to each other as required.

The process described in relation to FIG. 5 may be modified to start from an SOI wafer by etching as occurs in the process described in relation to FIG. 4. The regrowth may be from the silicon substrate or the silicon device layer.

If the double SOI is used, etching the trenches may comprise etching through the top silicon device layer, through the low refractive index layer, through the intermediate device layer and into the further low refractive index layer. Trenches may be etched through the whole height of the further low refractive index layer so that a base of the trench is formed by a surface of the substrate. Etching of a trench may be through the top silicon device layer and into the low refractive index layer. A trench may be etched through the whole height of the low refractive index layer so that a base of the trench is formed by a surface of the intermediate device layer.

The regrowth may be from the silicon substrate when one of the trenches has its base in the silicon substrate, or may be from the silicon intermediate device layer, or may be from the top silicon device layer.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of manufacturing a photonic chip, the method comprising:
   providing a silicon-on-insulator wafer comprising a substrate formed of silicon, a low refractive index layer above the substrate, and a silicon device layer; and
   forming a first trench having a first height and a second trench having a second height by etching the low refractive index layer and the silicon device layer, the second height being greater than the first height, and the second trench having a bottom surface that is closer to the substrate than a bottom surface of the first trench.

2. A method according to claim 1, wherein etching comprises reactive ion etching.

3. A method according to claim 1, wherein etching the first trench and etching the second trench occur simultaneously.

4. A method according to claim 1, wherein a width of the second trench is greater than a width of the first trench.

5. A method according to claim 1, wherein forming the second trench comprises etching through the height of the low refractive index layer and a base of the trench is formed by the substrate.

6. A method according to claim 1, the method further comprising forming a first waveguide in the first trench and forming a second waveguide in the second trench.

7. A method according to claim 6, wherein the first and/or second waveguide is formed of silicon.

8. A method according to claim 7, wherein the step of forming the first and/or second waveguide comprises filling the respective first and/or second trench with polycrystalline silicon, amorphous silicon or single crystal silicon.

9. A method according to claim 7, wherein the step of forming the first and/or the second waveguide comprises epitaxially growing silicon in the respective first and/or second trench.

10. A method according to claim 7, wherein the step of forming the first and second waveguides comprises:
    overfilling the first and second trenches with silicon, such that silicon in the first trench is joined to silicon in the second trench by excess silicon above the low refractive index layer and,
    regrowing the silicon in the first and second trenches to form single crystal silicon.

11. A method according to claim 7, wherein the step of forming the first and second waveguides comprises planarising the silicon in the first and the second trenches, such that a top surface of the first waveguide is coplanar with a top surface of the second waveguide.

12. A method according to claim 6, wherein the step of forming the first and/or second waveguide comprises etching material in the respective first and/or second trench to form a rib waveguide.

13. A method according to claim 6, wherein forming the first waveguide and forming the second waveguide occurs simultaneously.

14. A method according to claim 6, wherein a width of the first waveguide is greater than a width of the second waveguide.

* * * * *